United States Patent [19]

Wagner et al.

[11] Patent Number: 4,932,727
[45] Date of Patent: Jun. 12, 1990

[54] AUTOMOTIVE VEHICLE BRAKE SYSTEM

[75] Inventors: Wilfried Wagner, Huettenberg-Weidenhausen; Lothar Schiel, Hofheim, both of Fed. Rep. of Germany

[73] Assignee: Alfred Teves GmbH, Frankfurt am Main, Fed. Rep. of Germany

[21] Appl. No.: 336,948

[22] Filed: Apr. 12, 1989

[30] Foreign Application Priority Data

Apr. 27, 1988 [DE] Fed. Rep. of Germany ....... 3814222
May 26, 1988 [DE] Fed. Rep. of Germany ....... 3817786

[51] Int. Cl.$^5$ ................ B60T 8/44; B60T 13/00; F01B 19/00
[52] U.S. Cl. ................ 303/114; 303/4; 188/357; 60/547.1; 92/50
[58] Field of Search ............ 303/4, 12, 110, 113, 303/114, 115, 119; 188/181 A, 356, 357; 60/547.1, 556, 565, 581; 91/376 R, 368; 92/48, 50

[56] References Cited

U.S. PATENT DOCUMENTS

| | | | |
|---|---|---|---|
| 3,482,485 | 12/1969 | Abbott | 92/48 X |
| 3,559,532 | 2/1971 | MacDuff | 303/114 X |
| 4,576,004 | 3/1986 | Bach | 91/376 X |
| 4,828,337 | 5/1989 | Wagner et al. | 303/114 |

FOREIGN PATENT DOCUMENTS 3715839 11/1988 Fed. Rep. of Germany ...... 303/114

Primary Examiner—Andres Kashnikow
Assistant Examiner—Timothy Newholm
Attorney, Agent, or Firm—Robert P. Seitter

[57] ABSTRACT

In an anti-lock automotive vehicle brake system comprising a vacuum brake power booster, a considerable reduction of manufacturing and assembling costs is obtained while the system's reliability in operation is simultaneously augmented by the incorporation into this brake system of a second movable wall arranged within the vacuum brake power booster to which a controllable pressure differential may be applied. The wall isolates two pneumatic working chambers and, in the case of slip control, is movable in a direction opposite to the actuating direction of the master brake cylinder by two compensating cylinders which are connected with the master brake cylinder pressure chambers. A hydraulic chamber which is normally in communication with an unpressurized pressure-fluid supply reservoir is sealed from the reservoir by a retention valve during slip control to hydraulically prevent brake petal induced pressure from being applied to the master cylinder.

33 Claims, 6 Drawing Sheets

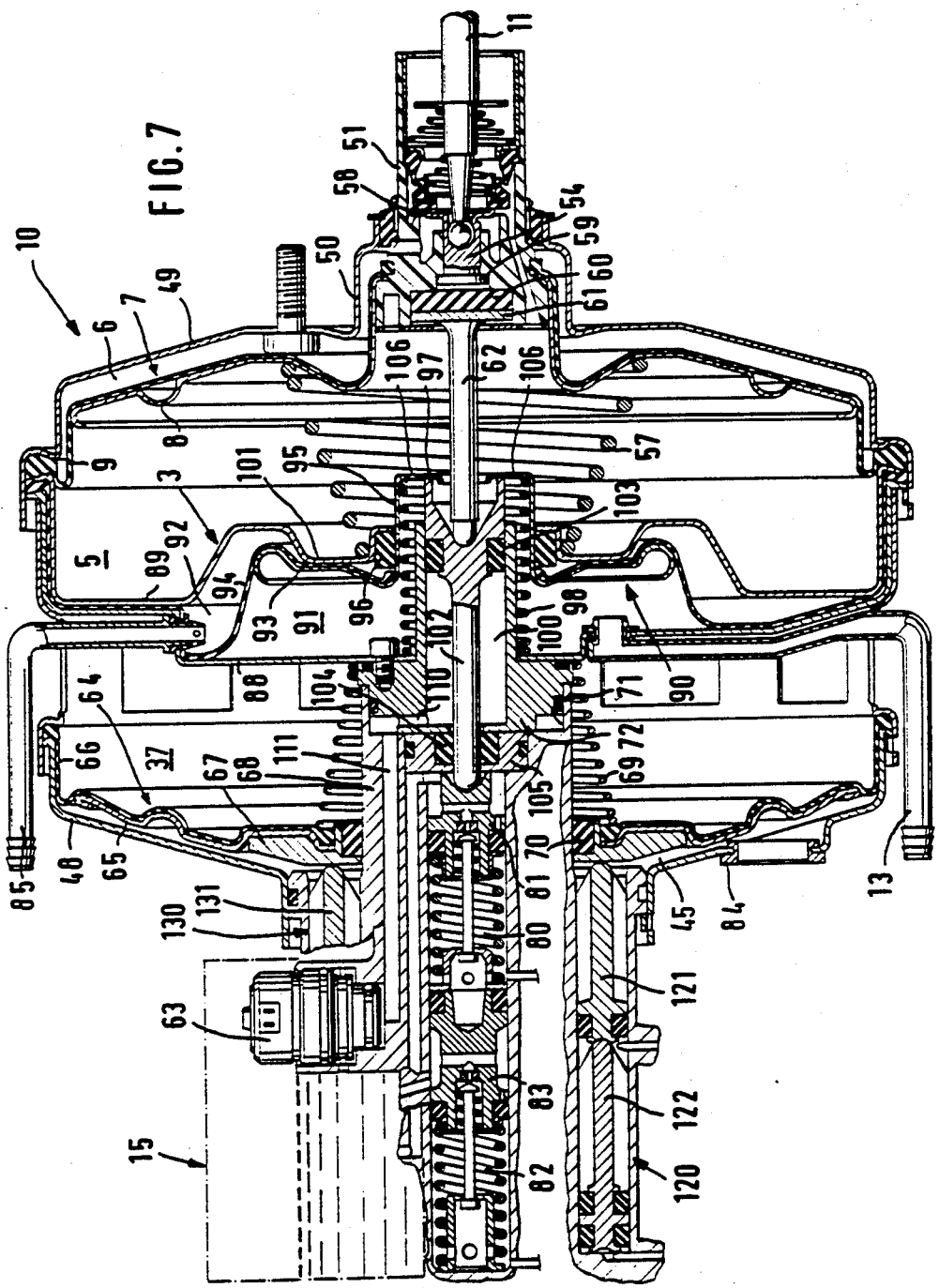

AUTOMOTIVE VEHICLE BRAKE SYSTEM

BACKGROUND OF THE INVENTION

The present invention relates to an automotive vehicle brake system having a vacuum brake power booster which is interposed between brake pedal and master brake cylinder and which comprises at least two working chambers subdivided by a movable wall, one thereof communicating with the vacuum source, while the other one is adapted to be ventilated by means of a control valve actuatable by the brake pedal, with a view to generating a boosting force that is proportional to the brake pedal force, wherein wheel brake cylinders connect via brake lines to a primary and a secondary pressure chamber of the master brake cylinder, with sensors allocated to the wheels to be braked which sense the rotational behavior of the wheels in order to determine wheel-lock and whose output signals can be delivered to a central electronic control, the control signals of which serve to control electromagnetically actuatable pressure-fluid inlet and outlet valves inserted into the brake lines for slip control.

A brake system of this type is known, for instance, from German published patent application No. 36 27 000. The special feature of this known brake system operating with a hydraulic auxiliary-pressure supply system resides in that, in order to be able to quickly decrease the braking pressure generated by the master brake cylinder when a slip control action becomes necessary, the pistons of the master brake cylinder are provided with central regulating valves which, in the brake's release position, open pressure-fluid connections between a pressure-fluid supply reservoir and the pressure chambers of the master brake cylinder and close these pressure-fluid connections in the braking position, with the brake lines being in communication via supply lines containing non-return valves with the motively driven pumps of the auxiliary-pressure supply system, the intake ports of the pumps connecting via a suction line with the pressure-fluid supply reservoir.

What is to be regarded as less advantageous in the previously known brake system is the considerable structural effort which is required for generating and controlling the auxiliary hydraulic pressure, for resetting the master brake cylinder pistons as well as for safeguarding the braking function upon failure of individual brake circuits.

Therefore, an object of the present invention is to devise a brake system of the type initially referred to in such a fashion that there is achieved considerable reduction of the necessary manufacturing and assembling costs, while the system's reliability in operation is simultaneously increased. A further object is that the master cylinder pistons and, respectively, the brake pedal are to be reset completely after each slip control action.

SUMMARY OF THE INVENTION

These objects are achieved by the present invention in that a second movable wall to which a controllable pressure differential is applicable is provided in the vacuum brake power booster which wall isolates two additional pneumatic working chambers and, in the slip control case, is movable in a direction opposite to the actuating direction of the master brake cylinder due to the effect of two compensating cylinders which are allocated to the master brake cylinder pressure chambers. Also, there is provided a hydraulic chamber which is in operative connection with a force-output member of the vacuum brake power booster, the chamber's connection with an unpressurized pressure-fluid supply reservoir being closable by way of a seat valve.

A favorable improvement of the subject matter of this invention is wherein an intermediate piston is slidably guided in the chamber, which piston cooperates with the force-output member, on the one hand, and with a primary piston of the master brake cylinder, on the other hand. Upon failure of the boosting force, this measure permits a direct mechanical transmission of the brake pedal force, i.e., to apply the latter force directly to the master brake cylinder.

A particularly effective decrease of the hydraulic pressure prevailing in the master brake cylinder will be achieved in the event of slip control action in that relief pistons are displaceably guided in each compensating cylinder, the relief pistons confining relief chambers connectible to the master brake cylinder pressure chambers and abutting on the second diaphragm plate.

The second movable wall is preloaded by means of a compression spring in the direction of the relief pistons so that, upon failure of the vacuum, no vibration of the second movable wall may occur. Moreover, this construction determines in a particularly simple fashion a defined inactive position for the second movable wall.

Another preferred feature of this invention is characterized in that the compensating cylinders are arranged lying side by side in the master cylinder housing. The integral design of the master brake cylinder with the two compensating cylinders permits the use of a particularly compact, stable component part which lends itself to low-cost manufacture.

In order to enable a traction slip control action in the inventive brake system both in the case of a diagonal brake-circuit configuration as well as in the event of a front-axle/rear-axle brake circuit configuration for front-wheel and rear-wheel drive, a favorable improvement is provided in which a pneumatic actuating unit is provided between the vacuum brake power booster and the master brake cylinder which allows actuation of the master brake cylinder irrespective of the brake pedal's position.

A particularly space-saving improvement of the subject matter of this invention is provided in that the actuating unit is arranged in the booster housing and is designed as a closed pneumatic chamber which is subdivided by a third movable wall into two working chambers and to which a differential pressure is applicable.

In a particularly compact embodiment of the present invention which lends itself to low-cost manufacture, it is provided that the pneumatic chamber is confined by a first and a second partition wall, the master brake cylinder being secured to the first partition wall while the second partition wall bounds the vacuum chamber of the vacuum brake power booster.

Another preferred feature of this invention can be seen in that the first working chamber is permanently communicating with both the vacuum source and the vacuum chamber of the vacuum brake power booster. This measure permits the simultaneous evacuation of both chambers by using one single vacuum port.

BRIEF DESCRIPTION OF THE DRAWINGS

Further features, advantages and possibilities of application of this invention can be gathered from the claims and from the following description of embodiments of the invention with reference to the accompanying drawings. In the drawings, FIG. 7 is a cross-section taken through a vacuum brake power booster used on the automotive vehicle brake system according to FIG. 6.

DETAILED DESCRIPTION

Figure 1:
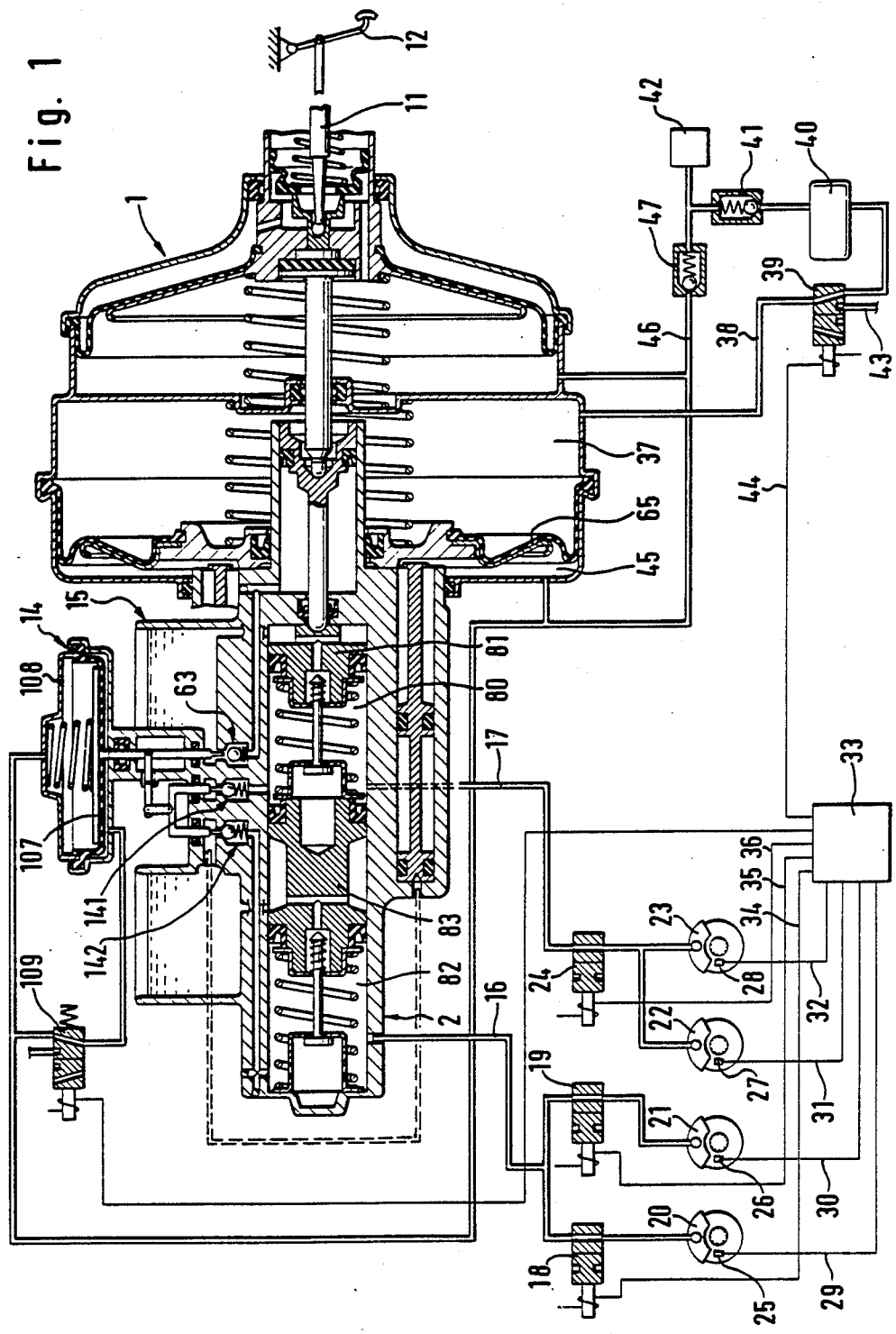
FIG. 1 is a schematic illustration of an automotive vehicle brake system according to the invention.

In the various Figures of the drawing, like component parts have been assigned like reference manuals.

FIG. 1 shows an automotive vehicle brake system comprising a vacuum brake power booster 1 which is coupled to a brake pedal 12 via a piston rod 11 in a known manner. On the side of the vacuum brake power booster 1 remote from the piston rod 11, there is provision of a tandem master brake cylinder 2 which is in communication with a brake-fluid reservoir 15. Connected to the tandem master brake cylinder 2 are a first and a second brake circuit 16 and 17, respectively.

Via two solenoid valves 18, 19 designed as two-way/two-position control valves, the first brake circuit 16 connects the wheel brake cylinders of the two wheel brakes 20 and 21, respectively, which are shown schematically, with the tandem master brake cylinder 2. Each of the two solenoid valves 18, 19 opens and closes a pressure-fluid line leading to one of the two front-wheel brakes 20 and 21. The second brake circuit 17 connects the wheel brake cylinders of the other two wheel brakes 22, 23, which are likewise shown schematically, with the tandem master brake cylinder 2 via a common solenoid valve 24 that is also designed as a two-way/two-position control valve.

Associated with each of the front-wheel and rear-wheel brakes 20, 21, 22 and 23 are sensors 25, 26, 27 and 28, respectively, which are connected with a central electronic control 33 via corresponding signal lines 29, 30, 31 and 32, respectively. The sensors 25, 26, 27 and 28, which can be designed as inductive transducers for instance, monitor the wheel rotational behavior and supply corresponding signals via the signal lines 29, 30, 31 and 32, respectively, to the electronic control 33. The electronic control 33 is connected via control lines 34, 35 and 36 with the solenoid valves 18, 19 and 24, respectively, in order to actuate these in dependence upon the sensor signals.

A first pneumatic working chamber 37 of the vacuum brake power booster 1 communicates with a vacuum source 42 via a vacuum line 38, a change-over solenoid valve 39, a vacuum accumulator 40 and a non-return valve 41. The change-over solenoid valve 39 is designed as a three-way/two-position directional control valve which, in its first position—when it is de-energized—connects the vacuum line 38 with the vacuum accumulator 40 and the vacuum source 42, respectively. In its second position, the change-over solenoid valve 39—when it is energized—closes the passage to the vacuum source 42 and, simultaneously, connects the vacuum line 38 with the atmosphere via port 43. In order to actuate the change-over solenoid valve 39 by virtue of the central electronic control 33, there is provided a control line 44 from the electronic control 33 to the change-over solenoid valve 39.

A second pneumatic working chamber 45 of the vacuum brake power booster 1 connects via a vacuum line 46 and a non-return valve 47 directly to the vacuum source 42.

It is also possible to conceive a different arrangement of the working chambers 37, 45 and their ports, namely, that the first pneumatic working chamber 37 is in permanent communication with the atmosphere, while the second working chamber 45 is connected alternatively to the vacuum source 42 or to the atmosphere by means of the change-over solenoid valve 39. This change-over solenoid valve 39 can also be substituted by two two-way/two-position control valves. In this event, there is no need for the vacuum accumulator 40 so that the first and/or the second working chamber 37 and/or 45 of the vacuum brake power booster 1 is in connection with the vacuum source 42 via the vacuum line 38, the change-over solenoid valve 39 as well as a non-return valve 41.

Figure 2:
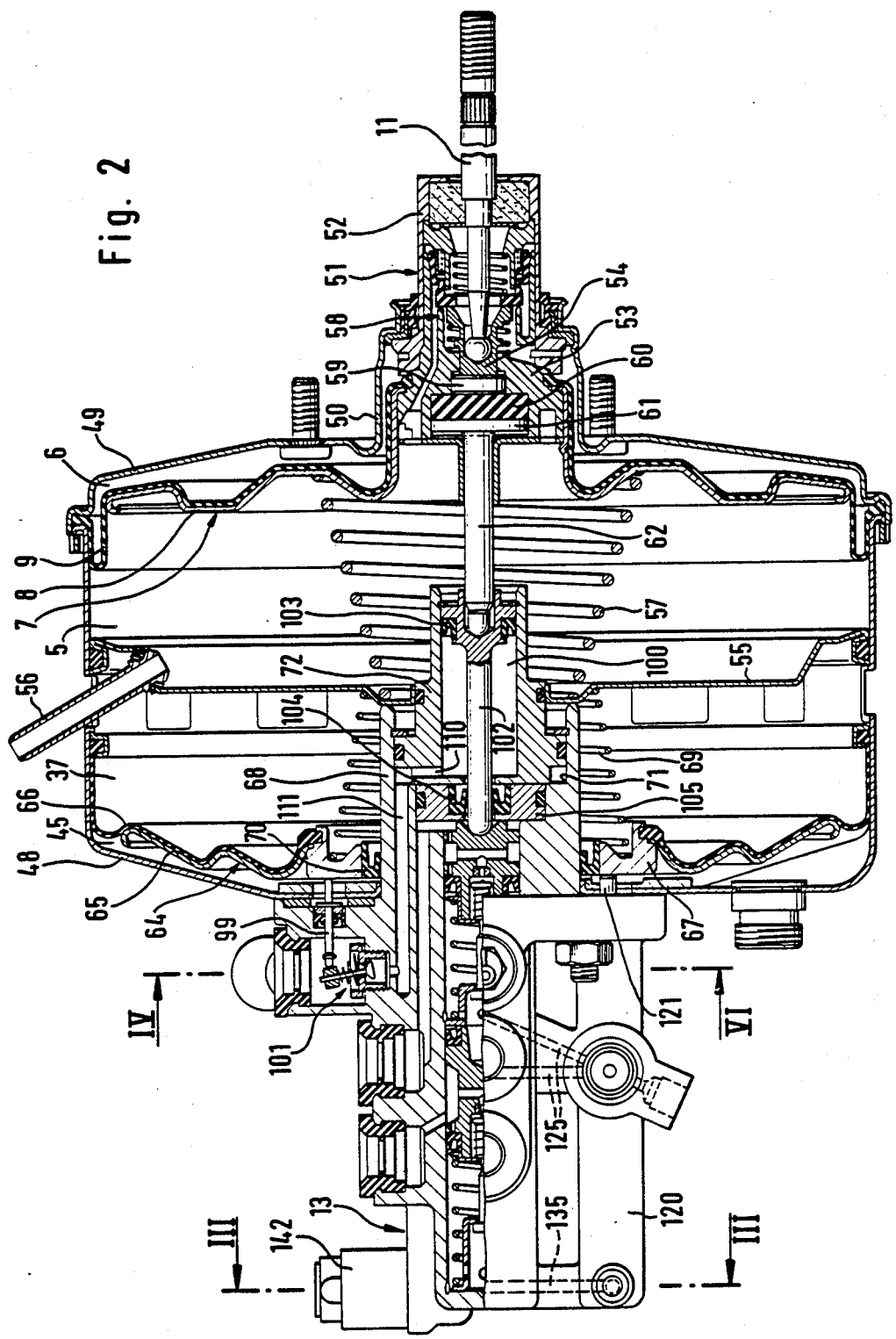
FIG. 2 is a cross-section taken through an embodiment of a vacuum brake power booster.

According to FIG. 2, the booster housing 10 of the vacuum brake power booster 1 is composed of two shell-shaped housing parts 48, 49 assembled with their open sides facing each other. The housing part 48 which is on the left-hand side in FIG. 2 is rigidly coupled to the tandem master brake cylinder 2, while the right-hand housing part 49 comprises a central guide socket 50 which holds the control valve housing 51 of the vacuum brake power booster 1 in a slidingly guided and vacuum-tight manner. The control valve housing 51 includes a rear control housing part 52 which extends out of the vacuum brake power booster 1 in the direction of the brake pedal 12 as well as a front control housing part 53 which is substantially arranged within the brake power booster 1.

A partition wall 55 disposed between the two housing parts 48, 49 separates the first pneumatic working chamber 37 from a vacuum chamber 5 which is connectible to the vacuum source 42 via a vacuum port 56. In turn, the vacuum chamber 5 is isolated from a working chamber 6 by means of a first movable wall 7 consisting of a diaphragm plate 8 and a rolling diaphragm 9 abutting thereon, the said working chamber 6 being adapted to be ventilated by means of a control valve assembly 58 arranged in the control valve housing 51. The control valve assembly 58 itself is actuated by a valve piston 54 which is coupled to the piston rod 11 and which transmits the actuating force introduced via the brake pedal 12 onto push rod 62, via a transmission disc 59, a rubber-elastic reaction disc 60 and a pressure plate 61. To reset the movable wall 7, there is provision of a resetting spring 57 which is compressed between the partition wall 55 and the diaphragm plate 8.

The two pneumatic working chambers 37, 45, which are preferably arranged in the front housing part 48, are isolated from each other by means of a second movable wall 64, on the second diaphragm plate 65 of which a second rolling diaphragm 66 is abutting whose outer periphery is secured to the housing part 48 and whose inner periphery is fixed together with the second diaphragm plate 65 to a guide ring 67. Guide ring 67, which is slidably guided on an axial extension 68 extending up to the partition wall 55, simultaneously forms an abutment surface for a compression spring 69 bearing against the partition wall 55 and biasing the second movable wall 64 in the inactive position in the direction of the front housing part 48. A ring seal 70 serves to seal the guide ring 67 relative to the axial extension 68.

The axial extension 68 containing a stepped bore 71 accommodates at its end a cylindrical component 72 which is supported therein unslidably and extends through the partition wall 55 in a sealed manner. The interior of the cylindrical component 72 forms a hydraulic chamber 100 which, via pressure-fluid channels 110, 111 as well as a retention valve designated generally 101 in FIG. 2 which corresponds functionally to the valve 63 of FIG. 1, is in communication with the pressure-fluid supply reservoir 15 shown in FIG. 1. In said chamber 100, an intermediate piston 102 provided with a sealing sleeve 103 is axially slidably guided, the said piston cooperating with push rod 62 on the one hand, and with a primary piston 81 of the master brake cylinder 2 on the other hand. In its area adjacent to the primary piston 81, the intermediate piston 102 extends through a ring seal 104 which is inserted into a radial recess of a closure member 105 mounted in the stepped bore 71. The retention valve 101, which like valve 63 of FIG. 1, closes and opens the hydraulic connection between the chamber 100 and the pressure-fluid reservoir 15, is actuated by the second movable wall 64 via an actuating tappet 99 in the embodiment shown in FIG. 2. To augment reliability of operation, the closing of the retention valve 101 can additionally be performed by means of an electromagnet 150 (shown in FIG. 4) energizable by the central electronic control 33. In another embodiment of the invention, the retention valve 63 is actuated by virtue of a pneumatic actuating unit 14, preferably a vacuum box 108 (shown in FIG. 1), the movable diaphragm wall 107 of which is exposed to a pneumatic pressure differential which is controllable in the vacuum box 108 by means of a solenoid three-way/two-position directional control valve 109 (FIG. 1), which is energized by way of a control signal of the central electronic control 33.

Figure 3:
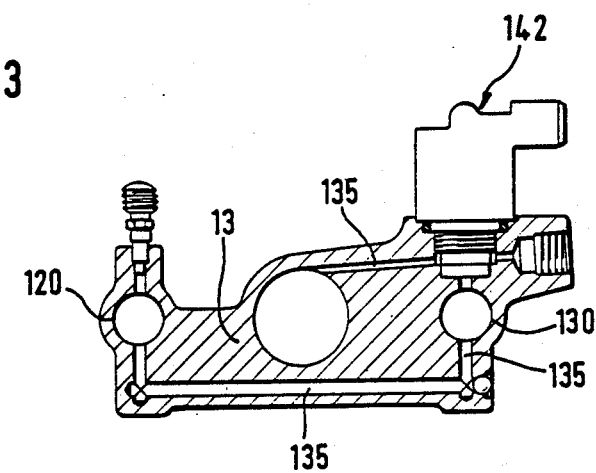
FIG. 3 is an enlarged cross-sectional view of a detail of the vacuum brake power booster according to FIG. 2.
Figure 4:
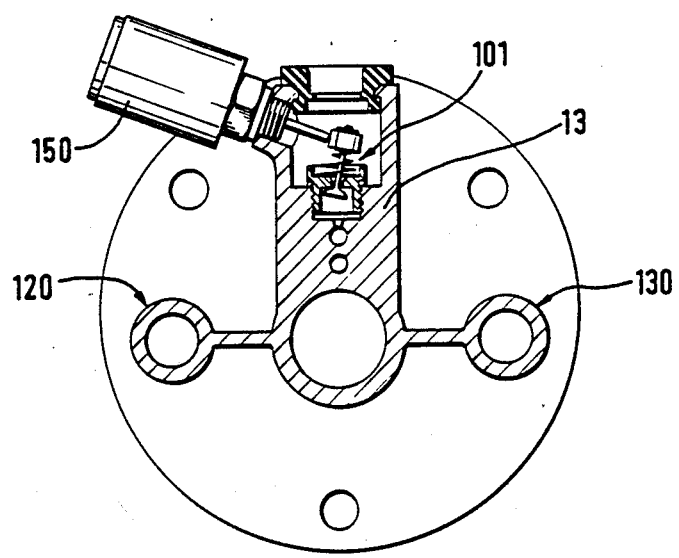
FIG. 4 is an enlarged cross-sectional view of a second detail of the vacuum brake power booster according to FIG. 2.
Figure 5:
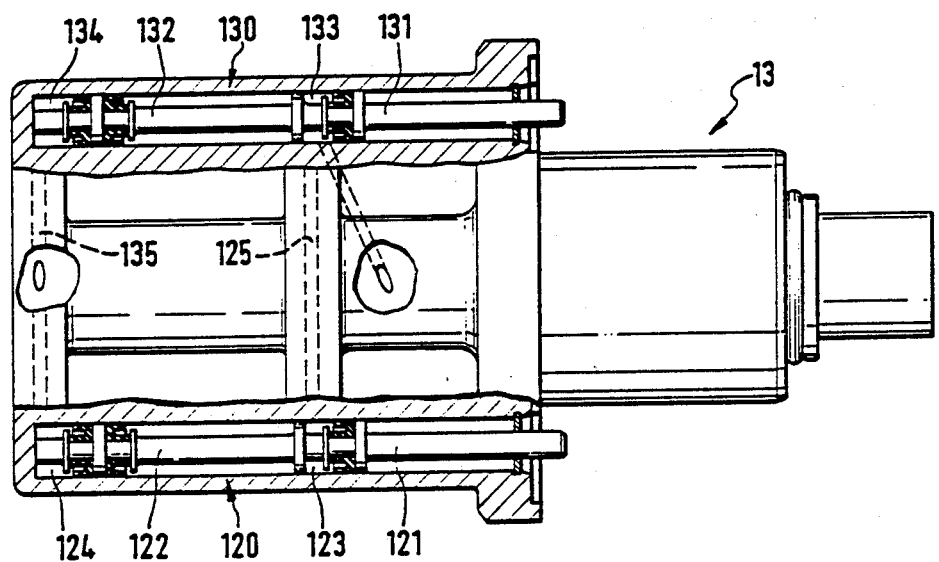
FIG. 5 is a partial cross-section of a master brake cylinder used on the inventive automotive vehicle brake system.

In order to be able to quickly decrease the hydraulic pressure prevailing in the master brake cylinder pressure chambers 80, 82 in the event of a slip control action, there are provided two compensating cylinders 120, 130 with relief pistons 121, 122, 131, 132 displaceably guided therein. As shown in FIGS. 3-5, the compensating cylinders 120, 130 are, preferably, integrated in the housing of the master brake cylinder 2 arranged in parallel one to the other. The relief pistons 121, 122, 131, 132 confine in the compensating cylinders 120, 130 relief chambers 123, 124, 133, 134 which, by means of connecting ducts 125, 135, are interconnected as well as are connected with the individual pressure chambers 80, 82 of the master brake cylinder 2. These connecting ducts 125, 135 are adapted to be closed and/or opened by means of compensating valves 141, 142 which are actuatable either electromagnetically (as shown in FIG. 3) or mechanically by the vacuum box 108 (as shown in FIG. 1).

The operation of the inventive automotive vehicle brake system shown in the above drawings is as follows:

When the brakes are released, that is, in the non-actuated condition of the vacuum brake power booster 1, all four working chambers 5, 6, 37, 45 are evacuated so that like pressure conditions are prevailing therein. The compression spring 69 preloads the second movable wall 64 and the guide ring 67 so that it will move to abut on the relief pistons 121, 131. In an arrangement as shown in FIG. 1, the retention valve 63 is held opened by vacuum box 108, with valve 109 being in the position shown in FIG. 1. In the arrangement shown in FIG. 2, the retention valve 101 is kept open by the second movable wall 64 via the actuating tappet 106, thereby establishing a hydraulic connection between the chamber 100 and the unpressurized pressure-fluid supply reservoir 15. The connections between the pressure chambers 80, 82 of the master brake cylinder 2 and the relief chambers 123, 133 and 124, 134, respectively, of the compensating cylinders 120, 130 are interrupted by the closed compensating valves 141, 142.

When now the brake pedal 12 is depressed on braking, the effect of that force causes the piston rod 11 with the valve piston 54 to be displaced to the left, the control valve assembly 58 being actuated as a result. In consequence thereof, a pressure differential proportional to the pedal force is introduced at the movable wall 7 and generates a boosting force which adds to the pedal force and is transmitted via the push rod 62 onto the intermediate piston 102. This intermediate piston 102 directly actuates the primary piston 81 of the master brake cylinder 2 as well as indirectly actuating the secondary piston 83 thereof in order to build up a hydraulic pressure in both pressure chambers 80 and 82 which is supplied to the individual wheel brakes 20, 21, 22 and 23 via the brake circuits 16 and 17. Upon advancement of the intermediate piston 102, the brake fluid is displaced out of chamber 100 via the open retention valve 63 into the pressure-fluid supply reservoir 15. Application and release of the brakes in this first mode of operation are thus functioning as in a known vacuum brake power booster.

Should any one or more of the sensors 25, 26, 27, 28 detect locking of its associated wheel during a braking action and signal this fact to the central electronic control 33, the latter will generate switch-over signals which cause simultaneous opening of the compensating valves 141, 142 as well as closing of the retention valve by shifting of valve 109 or closure of retention valve 101. Closing of this retention valve 101 takes place only after the second movable wall 64 has been moved to the right by the relief pistons 121, 122, 131, 132 in opposition to the force of the compression spring 69 and the electromagnet 150 activated. The pressure in the master-brake-cylinder pressure chambers 80 and 82 can discharge via the open compensating valves 141 and 142 into the compensating cylinders 120, 130. The second movable wall 64 is displaced to the right in opposition to the force of the compression spring 69, and the retention valve 63 closes. With the retention valve 63 closed, hydraulic pressure of any magnitude desired can develop in the hydraulic chamber 100, without an increase in pressure occurring in the master brake cylinder 2. The pedal force of the driver as well as the boosting force of the movable wall 7 are prevented from taking effect. The pressure on the wheel brakes can now be reduced via the solenoid valves 18, 19 and 24.

When, in the course of slip-control, higher pressure is needed on the wheel brakes, the first pneumatic working chamber 37 will be ventilated by switch-over of the change-over solenoid valve 39 (as shown in FIG. 1). The boosting force which is generated by the pressure differential acting on the second movable wall 64 builds up higher pressure in the compensating cylinders 120 and 130 and thus in the master-brake-cylinder pressure chambers 80 and 82, which pressure may rise until it reaches a maximum which corresponds to the pressure introduced by pedal force. To modulate the pressure in the brake circuits 16, 17, vacuum and atmosphere are alternatingly applied to the first pneumatic working chamber 37 via the change-over solenoid valve 39.

When the anti-lock control action is terminated, the first pneumatic working chamber 37 will be fully ventilated, the two compensating valves 141, 142 as well as the retention valve 63 are switched back, and subsequently the working chamber 37 is evacuated. Thus, the entire system will re-assume the condition it had before the control action, and the braking operation can be continued normally or discontinued by removing the pedal force.

The braking operation can also be terminated by the driver during an anti-lock control action by removing the pedal force. In this event, the relief pistons 121, 122, 131, 132 and the second movable wall 64 will return, unpressurized, to their initial position.

Vacuum and/or atmosphere can be applied to the two pneumatic working chambers 37, 45 according to the following switching modes:

In a first switching mode, as illustrated in FIG. 1, the two pneumatic working chambers 37, 45 are evacuated in the absence of slip control. During a slip control action, atmosphere and vacuum is alternatingly applied to the first working chamber while chamber 45 remains connected at all times to vacuum source 42. Upon commencement of the control action, an instantaneous abrupt pressure reduction is performed in the master brake cylinder after change-over of the compensating valves 141, 142 and the retention valve 63. For pressure build-up, the first working chamber 37 must be ventilated under the control of valve 39 which, is in turn controlled by control unit 33. In order to terminate the control action, it is also required to ventilate the first working chamber 37 so that the relief pistons 121, 122, 131, 132 are shifted back into their initial position. Subsequently, the valves 63, 141, 142 are switched back, and the first working chamber 37 is evacuated.

According to a second switching mode not shown, but described above, the absence of slip control, the two working chambers 37, 45 are normally ventilated, and in a slip control action, vacuum and atmosphere, respectively, are alternatingly applied to the second working chamber 45. Application of vacuum to chamber 45 via a three-way valve connection to a vacuum source (similar to that of valve 39 of FIG. 1), establishes a pressure buildup.

Upon commencement of the slip control action, an instantaneous abrupt pressure reduction is performed in the master brake cylinder in opposition to the force of the compression spring 69. In order to terminate the control action, the second pneumatic working chamber 45 must be evacuated. The relief pistons 121, 122, 131, 132 will be reset into their initial position, the valves 63, 141, 142 will be switched back, and the second working chamber 45 will be ventilated.

According to a third switching mode, in the absence of slip control, the second working chamber 45 is evacuated, and the first working chamber 37 is ventilated. Upon commencement of the slip control action, the valves 63, 141, 142 are switched over as in the previously described switching modes. The second pneumatic working chamber 45 must be ventilated for reducing the pressure. In order to terminate the control action, the second working chamber 45 must be evacuated. The relief pistons 121, 122, 131, 132 are shifted back into their initial position by the movement of the second diaphragm plate 65, whereupon the valves 63, 141, 142 are switched back. In a particularly inexpensive system, there is no need for the two valves 141, 142 in this switching arrangement, since the second movable wall 64 is always acted upon by differential pressure in the normal mode and thus counteracts the braking pressure in the master-brake-cylinder pressure chambers 80, 82.

In a further embodiment of the inventive automotive vehicle brake system displayed in FIG. 6, valve assemblies 73, 74 are connected to the vacuum brake power booster 1 via pneumatic lines 79, 75 for purposes which will be explained in the text following hereinbelow. In the illustrated example, the first valve assembly 73 is formed by two two-way/two-position control valves 391, 392 which, via control lines 76, 44, are in connection with the electronic control 33.

In this embodiment, the first pneumatic working chamber 37 is in permanent communication with the atmosphere, while the second pneumatic working chamber 45 is adapted to be evacuated and/or ventilated by means of the first valve assembly 73.

The two-way/two-position control valve 392 governing the atmosphere port is preferably designed as a solenoid valve that is open in its de-energized state, while a solenoid valve that is closed in its de-energized state is used as two-way/two-position directional control valve 391 governing the vacuum port, the inlet of which valve is connected via the non-return valve 41 to the vacuum source 42. It is, however, likewise possible to use a single electromagnetically actuatable three-way/two-position directional control valve in place of the two valves 391, 392.

A pneumatic actuating unit 3 is directly connected to the vacuum source 42 via a second pneumatic line 78 connecting a second non-return valve 47 to vacuum port 13, the actuating unit 3 being designed as a closed pneumatic chamber 4 inside the vacuum brake power booster 1 and cooperating with the master brake cylinder 2 during a traction slip control operation.

The third pneumatic line 75 connects the vacuum source 42 and a pneumatic port 85 of the vacuum brake power booster 1 via the intermediary of the second valve assembly 74 which, in the illustrated example, is an electromagnetically switchable three-way/two-position directional control valve 401 which is energizable by the central electronic control 33 via a further control line 77. Of course, instead of the three-way/two-position directional control valve 401, two two-way/two-position control valves can also be used which, preferably, shall be used as a combination of a solenoid valve that is open in its de-energized state and one that is closed in its de-energized state.

Figure 6:
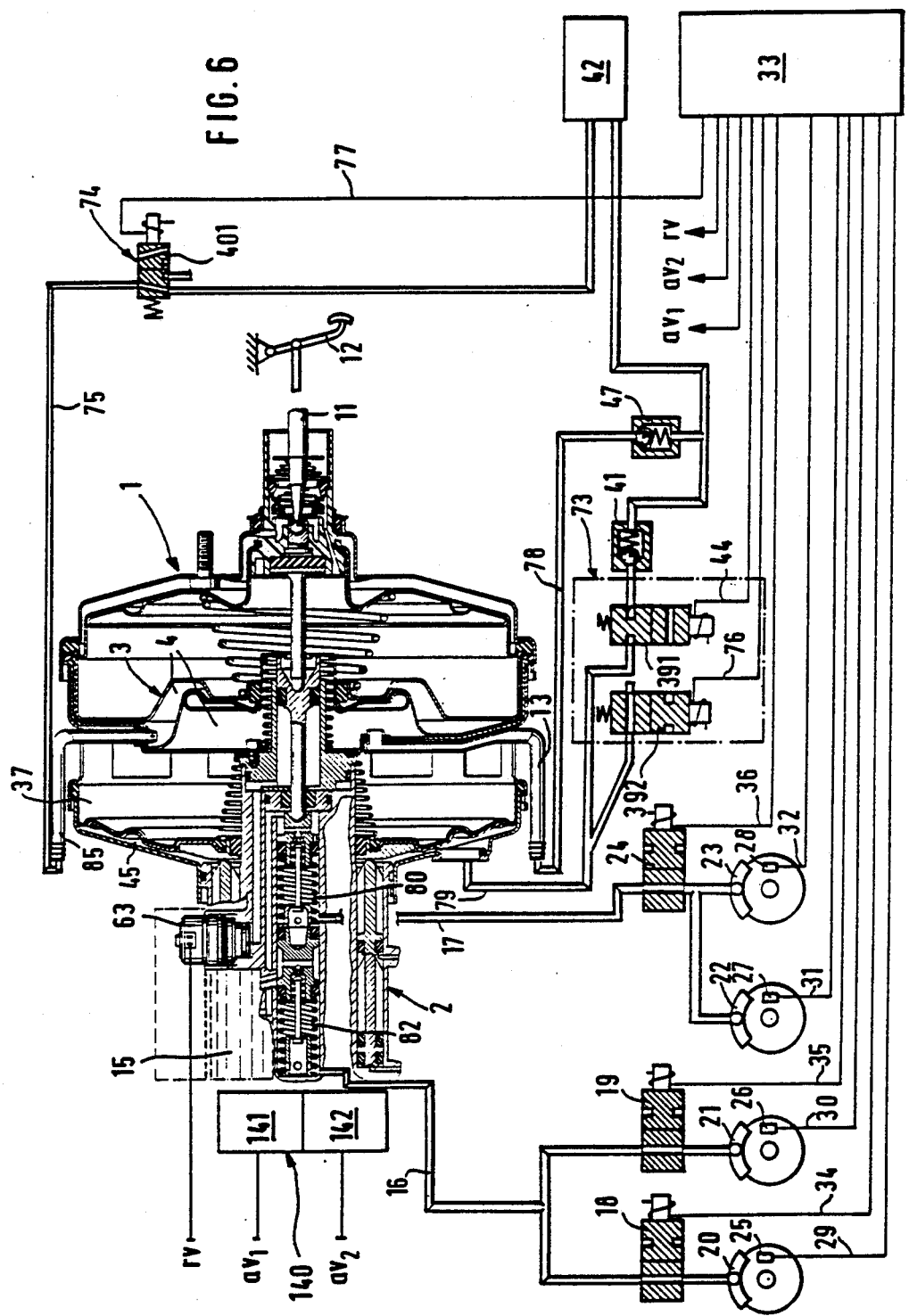
FIG. 6 is a schematic illustration of another embodiment of an automotive vehicle brake system according to the invention.

FIG. 6 shows a schematically indicated compensating-valve assembly 140 cooperating with the master brake cylinder 2 as well as the retention valves 141, 142 and 63, whose purpose is identical to that of the valve described in respect to FIG. 1. The schematically indicated compensating valves 141, 142 of the compensating-valve assembly 140 as well as the non-return valve 63 can be designed as electromagnetically actuatable valves which, via control lines $av_1$, $av_2$ and $rv$ are connectible to the central electronic control 33.

As further shown in FIG. 7, two partition walls 88, 89 are provided in the inside of the booster housing 10 of the vacuum brake power booster which confine the pneumatic chamber 4 forming the pneumatic actuating unit 3 referred to in respect of FIG. 6. This pneumatic chamber 4 is subdivided into two pneumatic working chambers 91, 92 by a third movable wall 90 which is formed by a third diaphragm plate 93 as well as a third rolling diaphragm 94 abutting thereon. The second partition wall 89 isolates said chamber 4 from the vacuum chamber 5 of the brake power booster 1 which is shown on the right hand in the drawing, the chamber 4 being connected with the vacuum source 42 via the vacuum port 13 that opens into the working chamber 91. The working chamber 92 is connectible either to a vacuum source or to the atmosphere via the pneumatic port 85, the pneumatic line 75 and the second valve assembly 74.

The retention valve 63 which closes and opens the hydraulic connection between the chamber 100 and the pressure-fluid reservoir 15 is designed as a solenoid valve activatable by the central electronic control 33 in the version shown in FIG. 7.

The operation of the inventive automotive vehicle brake system shown in FIGS. 6 and 7 is as follows:

When the brakes are released, that is in the non-actuated condition of the vacuum brake power booster 1, all working chambers 4, 5, 6, 37, 45 are pressure-balanced. While atmospheric pressure is prevailing in the working chambers 37, 45, the pneumatic working chambers 91 and 92 as well as the two working chambers 5, 6 of the vacuum brake power booster 1 are evacuated. The evacuation of the working chamber 91 takes place via the vacuum port 13 which is in permanent communication with the vacuum source 42, while the vacuum chamber 5 is evacuated via openings 106 in a radial collar 97 of an axial attachment 95 of the third diaphragm plate 93, the said attachment extending through a ring seal 96. Working chamber 6 is evacuated via the control valve assembly 58. The working chamber 92 communicates with the vacuum source 42 via the open three-way/two-position directional control valve 401. The third movable wall 90 is bearing against a stop 101 formed by the second partition wall 89 under the effect of a third resetting spring 98. The compression spring 69 preloads the second diaphragm plate 65 so that it will move to abut on the relief pistons 121, 131. Simultaneously, the retention valve 63 that is open in its de-energized state maintains a hydraulic connection between the chamber 100 and the unpressurized pressure-fluid supply reservoir 15. The connections between the pressure chambers 80, 82 of the master brake cylinder and the relief chambers 123, 133 and 124, 134, respectively, are interrupted by the closed compensating valves 141, 142.

Application and release of the brakes as well as the anti-lock control operations are performed in the automotive vehicle brake system of FIG. 6 occur as they do in the system shown in FIG. 1, so that a detailed description can be dispensed with.

When, during anti-lock control, higher pressure is needed on the wheel brakes, the second pneumatic working chamber 45 will be evacuated by switch-over of the first valve assembly 73. The boosting force which is generated by the pressure differential acting on the second movable wall 64 builds up higher pressure in the compensating cylinders 120 and 130 and thus in the master-brake-cylinder pressure chambers 80 and 82, which pressure may rise until it reaches a maximum which corresponds to the pressure introduced by pedal force. To modulate the pressure in the brake circuits 16, 17, vacuum and atmosphere are alternatingly applied to the second pneumatic working chamber 45 via the first valve assembly 73.

When the anti-lock control action is terminated, the second pneumatic working chamber 45 will be fully ventilated, and the two compensating valves 141, 142 as well as the retention valve 63 will be switched back. Thus, the entire system will re-assume the condition it had before the control action, and the braking operation can be continued normally or discontinued by removing the pedal force.

The braking operation can also be terminated by the driver during an anti-lock control action by removing the pedal force. In this event, the relief pistons 121, 122, 131, 132 and the second diaphragm plate 65 will return, unpressurized, to their initial position.

Should spinning of one or more of the driven wheels be detected by any one or more of the sensors 25, 26, 27, 28, a traction-slip control action must be initiated by the electronic control 33. The brake cylinders of the non-driven wheels are isolated in terms of pressure from the brake-power-booster/master-cylinder aggregate by an appropriate switching of the solenoid valves 18, 19, 24. Subsequently, the second pneumatic working chamber 92 is ventilated by change-over of the three-way/two-position directional control valve 401. The developing difference in pressure between the two working chambers 91, 92 produces a force on the third movable wall 90 which, via the intermediate piston 102, actuates the primary piston 81 and thus builds up an amount of pressure in the master-brake cylinder pressure chambers 80, 82 which is proportional to this force and causes the driven wheels to slow down. Due to the hydraulic isolation of the non-driven wheels from the master brake cylinder 2, this build-up auxiliary pressure has no effect on the brake cylinders of the non-driven wheels.

What is claimed is:

1. An automotive vehicle brake system having a vacuum brake power booster which is interposed between a brake pedal and a master brake cylinder which comprises at least two working chambers subdivided by a first movable wall, a first one of said chambers communicating with a vacuum source, a second one of said chambers being ventilated by means of a control valve actuatable by the brake pedal, said working chambers generating a boosting force that is proportional to a brake pedal force, wheel brake cylinders connected via brake lines to a primary and a secondary pressure chamber of the master brake cylinder, a central electronic control, and sensors allocated to the wheels to be braked which sense and provide output signals corresponding to the rotational behavior of the wheels in order to determine wheel-lock, said output signals being delivered to said central electronic control, said central electronic control providing control signals which control electromagnetically actuatable pressure-fluid inlet and outlet valves inserted into the brake lines for slip control, and said system further comprising a second movable wall provided in the vacuum power booster to which a controllable pressure differential is applied, first and second pneumatic working chambers isolated from each other by said second movable wall, and two compensating cylinders which, when slip control is activated, move said second movable wall in a direction opposite to the actuating direction of the master brake cylinder, said compensating cylinders being connected to said primary and secondary pressure chambers of said master cylinder, and further comprising a hydraulic chamber, a push-rod of the vacuum brake power booster operatively connected to said hydraulic chamber, an unpressurized pressure-fluid supply reservoir, and a retention valve selectively closing a connection between said supply reservoir and said hydraulic chamber.

2. The automotive vehicle brake system claimed in claim 1, wherein the second movable wall is sealingly guided on an axial extension of the master brake cylinder, and wherein the hydraulic chamber is arranged within the interior of said axial extension.

3. The automotive vehicle brake system claimed in claim 1, wherein the hydraulic chamber is arranged within a cylindrical component mounted in a stepped bore of an axial extension of the master brake cylinder.

4. The automotive vehicle brake system claimed in claim 3, wherein an intermediate piston is slidably guided in the hydraulic chamber and is operatively connected between the push rod of the vacuum brake power booster at one end and a primary piston of the master brake cylinder at another end.

5. The automotive vehicle brake system claimed in claim 4, further comprising two relief pistons displaceably guided in each of said two compensating cylinders, said relief pistons confining relief chambers connected to the master brake cylinder pressure chambers and abutting on a second diaphragm plate of the second movable wall.

6. The automotive vehicle brake system claimed in claim 5, wherein the second movable wall is preloaded in the direction of the relief pistons by means of a compression spring.

7. The automotive vehicle brake system claimed in claim 5, wherein each pressure chamber of the master brake cylinder is connected to one relief chamber of each compensating cylinder.

8. The automotive vehicle brake system claimed in claim 7, wherein connections between the master-cylinder pressure chambers and the relief chambers are closable by means of compensating valves.

9. The automotive vehicle brake system claimed in claim 8, wherein the compensating valves are solenoid valves closed in their de-energized state.

10. The automotive vehicle brake system claimed in claim 7, wherein the compensating valves are switched by means of a pneumatic actuating unit.

11. The automotive vehicle brake system claimed in claim 8, wherein the compensating valves include non-return valves which are open in the direction of the relief chambers and, respectively, the pressure chambers.

12. The automotive vehicle brake system claimed in claim 1, wherein the first pneumatic working chamber is selectively connected to said vacuum source and to the atmosphere by means of a valve assembly, and wherein the second pneumatic working chamber is in permanent communication with said vacuum source.

13. The automotive vehicle brake system claimed in claim 1, wherein the second pneumatic working chamber is selectively connected to said vacuum source and to the atmosphere by means of a valve assembly, and wherein the first pneumatic working chamber is in permanent communication with the atmosphere.

14. The automotive vehicle brake system claimed in either of claims 12 or 13, wherein the valve assembly comprises an electromagnetically actuatable three-way/two-position directional control valve.

15. The automotive vehicle brake system claimed in either of claims 12 or 13, wherein the valve assembly comprises two two-way/two-position control valves.

16. The automotive vehicle brake system claimed in claim 1, wherein the retention valve is a solenoid valve open in its de-energized state.

17. The automotive vehicle brake system claimed in claim 1, wherein the retention valve is switched mechanically by the second movable wall.

18. The automotive vehicle brake system claimed in claim 17, wherein the retention valve is additionally switched by a solenoid valve open in its de-energized state.

19. The automotive vehicle brake system claimed in claim 1, wherein the retention valve is switched by means of a pneumatic actuating unit.

20. The automotive vehicle brake system claimed in claim 13, wherein the pneumatic actuating unit comprises a vacuum box having a movable diaphragm wall which is acted upon by a pneumatic differential pressure.

21. The automotive vehicle brake system claimed in claim 20, wherein the pneumatic differential pressure is regulated by an electromagnetic three-way/two-position directional control valve which is energized by a control signal of the central electronic control.

22. The automotive vehicle brake system claimed in claim 1, wherein the compensating cylinders are arranged side by side in a housing of the master brake cylinder.

23. The automotive vehicle brake system claimed in claim 1, further comprising a pneumatic actuating unit arranged between the vacuum brake power booster and the master brake cylinder which is capable of actuating the master brake cylinder irrespective of the brake pedal's position.

24. The automotive vehicle brake system claimed in claim 23, wherein the actuating unit is arranged within a housing of the vacuum brake power booster.

25. The automotive vehicle brake system claimed in claim 24, wherein the pneumatic actuating unit comprises a closed pneumatic chamber which is subdivided by a third movable wall into two secondary working chambers and to which a differential pressure is applied.

26. The automotive vehicle brake system claimed in claim 25, wherein the pneumatic chamber is confined by a first and a second partition wall, the master brake cylinder being secured to the first partition wall and the second partition wall forming one surface of a vacuum chamber of the vacuum brake power booster.

27. The automotive vehicle brake system claimed in claim 25, wherein the third movable wall comprises a diaphragm plate as well as a rolling diaphragm abutting thereon, the central diaphragm plate comprising an axial tubular attachment which cooperates with an intermediate piston operatively connected between a push rod of the vacuum brake power booster and a primary piston of the master brake cylinder.

28. The automotive vehicle brake system claimed in claim 27, wherein the second partition wall forms an axial stop for the third movable wall and comprises a ring seal in which the tubular attachment is axially guided.

29. The automotive vehicle brake system claimed in claim 28, wherein the tubular attachment comprises a radial collar which abuts axially on the intermediate piston and on which a first end of a resetting spring is supported, a second end of said resetting spring being supported on the first partition wall and urging the third movable wall against the stop.

30. The automotive vehicle brake system claimed in claim 29, wherein the first one of said secondary working chambers is permanently connected to both the vacuum source and the vacuum chamber of the vacuum brake power booster.

31. The automotive vehicle brake system claimed in claim 30, further comprising a valve assembly which is activated by the central electronic control and which selectively connects the second working chamber to the vacuum source and to the atmosphere.

32. The automotive vehicle brake system claimed in claim 31, wherein the valve assembly comprises an electromagnetically actuatable three-way/two-position directional control valve.

33. The automotive vehicle brake system claimed in claim 31, wherein the valve assembly comprises two electromagnetically actuatable two-way/two-position control valves.

* * * * *